(12) United States Patent
Elliot et al.

(10) Patent No.: US 6,865,181 B1
(45) Date of Patent: Mar. 8, 2005

(54) METHOD AND APPARATUS FOR ROUTING TELECOMMUNICATIONS SIGNALS

(75) Inventors: Paul M. Elliot, Jenner, CA (US); Phu S. Le, Rohnert Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/532,611

(22) Filed: Mar. 22, 2000

Related U.S. Application Data

(60) Provisional application No. 60/125,527, filed on Mar. 22, 1999, and provisional application No. 60/125,533, filed on Mar. 22, 1999.

(51) Int. Cl.[7] .............................................. H04L 12/50
(52) U.S. Cl. ........................................ 370/364; 370/536
(58) Field of Search .............................. 370/398, 364, 370/422, 425, 504, 520, 535, 536, 537, 538, 465, 540, 426, 429, 359, 360

(56) References Cited

U.S. PATENT DOCUMENTS

| | | | | |
|---|---|---|---|---|
| 4,376,998 A | * | 3/1983 | Abbott et al. ................ | 370/225 |
| 4,888,586 A | | 12/1989 | Ise et al. ..................... | 370/221 |
| 4,967,405 A | * | 10/1990 | Upp et al. .................... | 398/50 |
| 4,998,242 A | | 3/1991 | Upp ............................. | 370/60 |
| 5,040,170 A | | 8/1991 | Upp et al. .................... | 359/135 |
| 5,161,152 A | * | 11/1992 | Czerwiec et al. ............ | 370/463 |
| 5,185,736 A | | 2/1993 | Tyrrell et al. ................ | 370/509 |
| 5,189,410 A | * | 2/1993 | Kosugi et al. ............ | 340/825.2 |
| 5,315,594 A | | 5/1994 | Noser .......................... | 370/353 |
| 5,329,520 A | | 7/1994 | Richardson .................. | 370/225 |
| 5,343,194 A | | 8/1994 | Bowden ...................... | 340/2.22 |
| 5,436,890 A | * | 7/1995 | Read et al. .................. | 370/352 |
| 5,497,363 A | | 3/1996 | Gingell ........................ | 370/466 |
| 5,737,320 A | * | 4/1998 | Madonna ..................... | 370/258 |
| 5,740,157 A | * | 4/1998 | Demiray et al. ............ | 370/219 |
| 5,771,274 A | | 6/1998 | Harris ....................... | 379/22.03 |
| 5,790,519 A | | 8/1998 | Hanson et al. ............... | 370/220 |
| 5,841,760 A | * | 11/1998 | Martin et al. ................ | 370/242 |
| 5,848,065 A | | 12/1998 | Gorshe et al. .............. | 370/539 |
| 5,872,780 A | | 2/1999 | Demiray et al. ............ | 370/359 |
| 5,901,136 A | * | 5/1999 | Lovelace et al. ............ | 370/217 |
| 6,038,212 A | | 3/2000 | Galand et al. ............... | 370/216 |
| 6,160,806 A | | 12/2000 | Cantwell et al. ............ | 370/466 |
| 6,188,686 B1 | * | 2/2001 | Smith .......................... | 370/388 |
| 6,359,859 B1 | | 3/2002 | Brolin et al. ................ | 370/218 |
| 6,392,989 B1 | | 5/2002 | Jardetzky et al. ........... | 370/216 |
| 6,414,953 B1 | * | 7/2002 | Lamarche et al. .......... | 370/359 |
| 6,424,649 B1 | * | 7/2002 | Laor et al. ................... | 370/359 |
| 6,580,720 B1 | | 6/2003 | Francis et al. .............. | 370/423 |

OTHER PUBLICATIONS

Technical Note, The Fundamentals of SONET, Telecommunications Techniques Corporation, pp. 1–28, Nov. 1994.

Ching et al, SONET Implementation, IEEE, pp. 34–40, Sep. 1993.

DeWilde et al, Integrated Switch and Cross–Connect Systems as a Flexible Transport Network, IEEE, pp. 675–678, Mar. 1988.

* cited by examiner

*Primary Examiner*—Hassan Kizou
*Assistant Examiner*—Donald Mills
(74) *Attorney, Agent, or Firm*—Ritter, Lang & Kaplan LLP

(57) ABSTRACT

The present invention discloses a method and apparatus for cross-connecting high-speed telecommunications signals at a cross-connect apparatus. The cross-connect apparatus can transmit the telecommunications signals from an input interface card to a cross-connect card, and from the cross-connect card to an output interface card without any synchronization information. Synchronization of the signals is accomplished with circuitry contained on the interface cards and the cross-connect card. The cross-connect apparatus also includes a control unit for managing the control and timing of the apparatus.

48 Claims, 10 Drawing Sheets

METHOD AND APPARATUS FOR ROUTING TELECOMMUNICATIONS SIGNALS

This application claims the priority of Provisional Applications 60/125,527 and 60/125,533 both of which were filed on Mar. 22, 1999. This application is also related to co-pending Application Ser. No. 09/274,078 which was also filed on Mar. 22, 1999 (the same day as the provisional applications). Applications 60/125,527, 60/125,533 and Ser. No. 09/274,078 are herein incorporated by reference but are not admitted to be prior art.

BACKGROUND OF THE INVENTION

Telecommunications (telecom) systems are carrying increasing amounts of information, both in long distance networks as well as in metropolitan and local area networks. At present, data traffic is growing much faster than voice traffic, and includes high bandwidth video signals. In addition to the requirement for equipment to carry increasing amounts of telecom traffic there is a need to bring this information from the long distance networks to businesses and to locations where it can be distributed to residences over access networks.

The equipment which has been developed to carry large amounts of telecom traffic includes fiber optic transport equipment which can carry high speed telecom traffic. The data rates on fiber optic systems can range from millions of bits per second (Mb/s) to billions of bits per second (Gb/s). In addition, multiple wavelengths of light can be carried on an optical fiber using Wavelength Division Multiplexing (WDM) techniques.

The ability to carry large amounts of telecom traffic on an optical fiber solves the long-distance point-to-point transport problem, but does not address the issue of how to add and remove traffic from the high-speed data stream. Equipment for adding and removing traffic has been developed and is referred to as "add-drop" multiplexers (ADMs).

Traditional designs for ADMs are based on the use of multiple interface cards which receive high-speed data streams, create a time division multiplex signal containing the multiple data streams, and route the time division multiplex signal to a cross-connect unit which can disassemble the data streams, remove or insert particular data streams, and send the signal to another interface card for transmission back into the networks. By aggregating the multiple data streams into a time division multiplexed data signal, the data rate of the time division multiplexed signal is by definition several times the rate of the maximum data rate supported by the interface cards. Traditional ADMs have proven adequate for interface data rates in the range of 155 Mb/s to 622 Mb/s.

However, optical signals of at least 2.4 Gb/s have become standard, and numerous problems arise with traditional ADMs due to the timing associated with the multiplexing and transmission of the high-speed-signals between the interface cards and the cross-connect unit. Thus, there is a need for cross-connect equipment which can support multiple high speed data streams (i.e., at least 2.4 Gb/s).

Standardized interfaces and transmission hierarchies for telecom signals have been developed and include Pleisochronous Digital Hierarchy (PDH), Synchronous Digital Hierarchy (SDH) standards, and Synchronous Optical Network (SONET). In addition to these telecom transport standards, standards have been developed for interconnecting businesses and computers within businesses. These Metropolitan and Local Area Network (MAN/LAN) standards include Ethernet, Gigabit Ethernet, Frame Relay, and Fiber Distributed Data Interface (FDDI). Other standards, such as Integrated Services Digital Network (ISDN) and Asynchronous Transfer Mode (ATM) have been developed for use at both levels.

Individual pieces of equipment can be purchased to support telecom or MAN/LAN standards. However, these devices generally either connect data streams using a signal protocol or convert entire data streams from one protocol to another. Thus, there is a need for a device which can establish interconnectivity between interfaces at the MAN/LAN level, while providing cross-connection to interfaces at the telecom network level.

Multiple interfaces are presently supported in cross-connect equipment using different interface cards. High-speed interface cards must be inserted into particular slots in order to insure that the high-speed signals can be transported to and from the cross-connect unit and to and from the high-speed interface cards. It would be desirable to have a cross-connect system in which all cards can support high-speed optical signals of at least 2.4 Gb/s, regardless of the card slot they are located in. Moreover, it would also be useful to have a system which would support routing, bridging, and concentration functions within MANs/LANs, as well as permitting access to telecom networks.

For the foregoing reasons, there is a need for a flexible cross-connect apparatus that includes a data plane and can support multiple high-speed optical interfaces in any card slot. Furthermore, the flexible cross-connect apparatus should establish connectivity between data cards and the telecom networks.

SUMMARY OF THE INVENTION

The present invention discloses a method and apparatus for cross-connecting high-speed telecommunications signals at a cross-connect apparatus. The cross-connect apparatus can transmit the telecommunications signals from an input interface card to a cross-connect card, and from the cross-connect card to an output interface card without any synchronization information. Synchronization of the signals is accomplished with circuitry contained on the interface cards and the cross-connect card. The cross-connect apparatus also includes a control unit for managing the control and timing of the apparatus.

According to one embodiment, an apparatus for flexibly transmitting data from at least a first interface card to at least a second interface card is disclosed. The apparatus is capable of supporting multiple types of interface cards and includes a plurality of interface cards for transmitting and receiving data streams. A cross-connect unit receives data streams from at least one of the plurality of interface cards and combines the received data streams so as to generate at least one cross-connected data stream. The at least one cross-connected data stream is transmitted to at least one of the plurality of interface cards. A control unit controls the operation of the apparatus. A backplane forms parallel data buses for providing connectivity between each of the plurality of interface cards, the cross-connect unit, and the control unit. The data streams are transmitted between the plurality of interface cards and the cross-connect unit over a clock recovery parallel bus without synchronization information.

According to one embodiment, an apparatus for routing data from at least a first interface card to at least a second interface card is disclosed. The apparatus is capable of supporting multiple types of interface cards, and includes a plurality of clock recoverable interface cards for transmitting and receiving data streams having no synchronization information and a plurality of clocked interface cards for transmitting and receiving data streams including data and synchronization information. A cross-connect unit receives data streams from at least one of said plurality of interface cards, combines the received data streams so as to generate at least one cross-connected data stream, and transmits the at least one cross-connected data stream to at least one of the plurality of interface cards. A control unit controls the operation of the apparatus. A backplane forms parallel data buses including clock recovered parallel data buses and clocked parallel buses. The parallel data buses provide connectivity between each of said plurality of interface cards, said cross-connect unit, and said control unit.

According to one embodiment, a method for flexibly transmitting telecommunications signals from at least a first interface card to at least a second interface using a cross-connect apparatus is disclosed. The method includes receiving at least a first telecommunications signal at a first interface card. A first payload, which includes the at least a first telecommunications signal, is transmitted from the first interface card to a cross-connect unit. The first payload is received at the cross-connect unit, which removes the first telecommunications signal from first payload and inserts the first telecommunications signal in a second payload. The second payload, which includes at least the first telecommunications signal, is transmitted from the cross-connect unit to a second interface card. The first payload and the second payload do not include synchronization information and are transmitted over a clock recovered parallel data bus formed in a backplane of the cross-connect apparatus.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention. In the drawings.

DETAILED DESCRIPTION OF THE PREFERRED EMBODIMENTS

Figure 1:
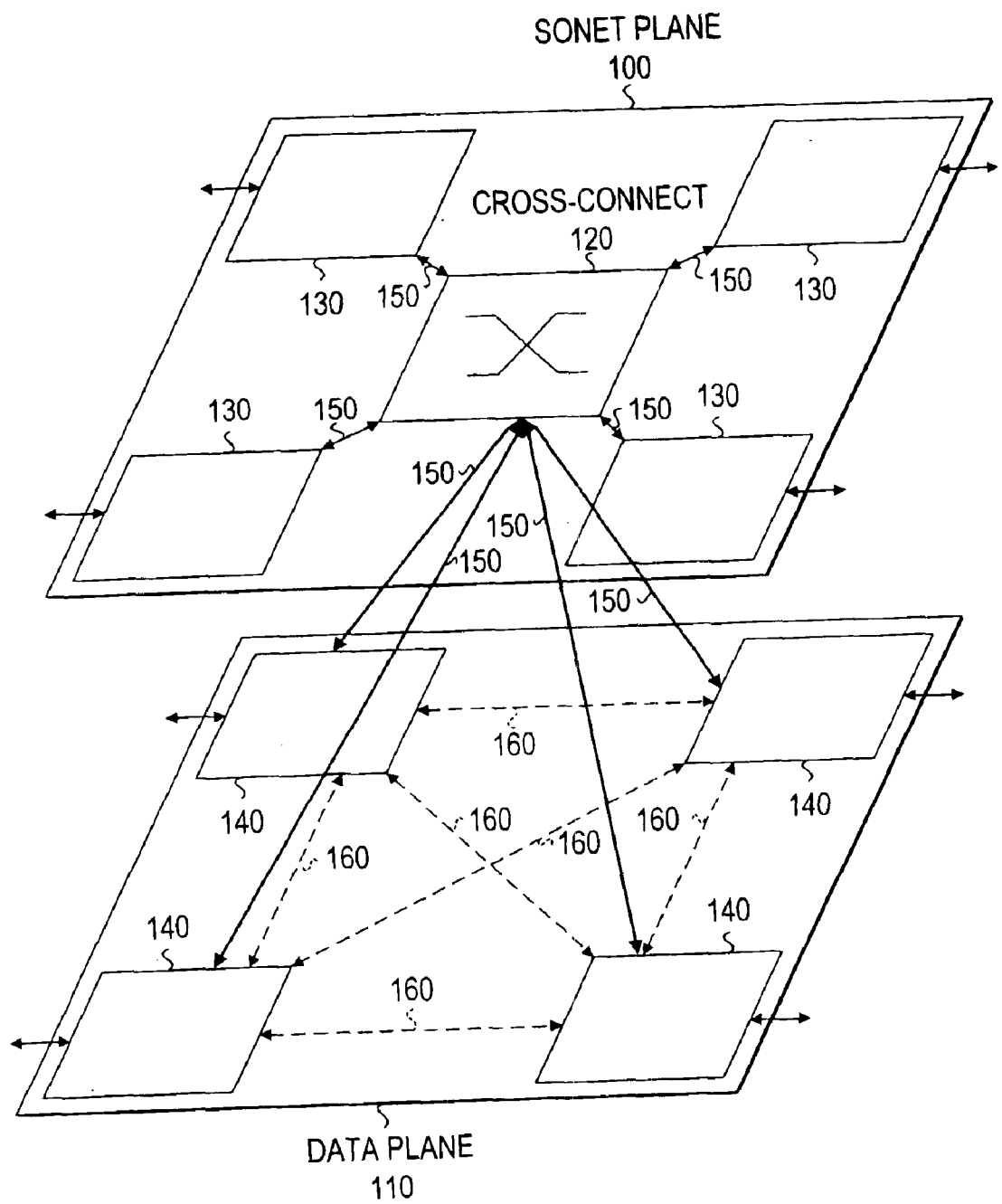
FIG. 1 illustrates a block diagram of the flexible cross-connect system, according to one embodiment.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 9 in particular, the apparatus and method of the present invention are disclosed.

The present invention supports numerous telecommunications (telecom) and networking standards, including the following which are incorporated herein by reference:

Bellcore Standard GR-253 CORE, Synchronous Optical Network (SONET) Transport Systems: Common Generic Criteria, Issue 2, December 1995;

Bellcore Standard GR-1230 CORE, SONET Bi-directional Line-Switched Ring Equipment Generic Criteria, Issue 3A, December 1996;

Bellcore TR-NWT-000496, SONET Add-Drop Multiplex Equipment (SONET ADM) Generic Criteria, Issue 3, May 1992;

Bellcore Transport System Generic Requirements FR-440, Issue No. 98, September 1998; IEEE/ANSI 802.3 Ethernet LAN specification; and Networking Standards, by William Stallings, published by Addison-Wesley Publishing Company (New York, 1993).

FIG. 1 illustrates a block diagram of a flexible cross-connect system 10 capable of routing traffic across two high-bandwidth planes. The flexible cross-connect system 10 includes a telecom plane 100, such as a SONET plane, and a data plane 110.

The telecom plane 100 includes telecom plane network interface subsystems 130, and the data plane 110 includes data plane network interface subsystems 140. A centralized fully non-blocking cross-connect unit (XC) 120 is located in the telecom plane 100, which interfaces with the telecom plane network interface subsystems 130 and the data plane network interface subsystems 140.

Standardized telecom traffic, such as SONET, Synchronous Digital Hierarchy (SDH) and Pleisochronous Digital Hierarchy (PDH), enters the system through the telecom plane network interface subsystems 130, such as electrical or optical interface subsystems. The telecom traffic is transmitted from the telecom plane network interface subsystems 130 over point-to-point connections 150 to the XC 120. The XC 120 processes the telecom traffic and then transmits the processed data back to a telecom network, such as a Wide Area Network (WAN), or transmits the processed data to a data network, such as a Metropolitan or Local Area Network (MAN/LAN). The processed data is transmitted to the telecom network via the telecom plane network subsystem(s) 130, and to the data network via the data plane network interface subsystem(s) 140.

Standardized telecom signals include, but are not limited to, DS-1 (1.5 Mb/s), B-ISDN (1.5 Mb/s) DS-2 (6.3 Mb/s), DS-3 (44.7 Mb/s), CEPT-1 (2.048 Mb/s), CEPT-2 (8.45 Mb/s), CEPT-3 (34.37 Mb/s), CEPT-4 (139.3 Mb/s), electrical STS-1 and its multiples, electrical STM-1 and its multiples, and optical OC-1 and its multiples. Other standardized and non-standardized transmission signal formats can be supported and are understood by those skilled in the art.

Standardized data traffic, such as Ethernet, enters the system through the data plane network interface subsystems 140, such as electrical or optical interface subsystems. The data plane network interface subsystems 140 communicate with the XC 120 via point-to point connections 150. The data plane 110 also allows for communications between data plane network interface subsystems 140 via point-to-point connectors 160. Thus, the data traffic can be processed by multiple data plane interface subsystems 140 before being transmitted to the XC 120 or back to the data network. As with the telecom traffic, the XC 120 processes the data traffic and transmits the processed data to a telecom network or a data network.

Standardized data signals include, but are not limited to, packet data transport formats such as Frame Relay, Asynchronous Transfer Mode (ATM), and Integrated Services Digital Network (ISDN); and MAN/LAN formats such as Ethernet, Fiber Distributed Data Interface (FDDI), and Token Ring. The interfaces supported by the data plane network interface subsystems 140 include electrical Ethernet interfaces such as 10 BaseT and 100 BaseT, as well as optical interfaces such as 1000 BaseT and Gigabit Ethernet. Other data-centric interfaces can be used and are understood by those skilled in the art.

In one embodiment, the point-to-point connections 150 between the XC 120 and the telecom plane network interface subsystems 130 or between the XC 120 and the data plane network interface subsystems 140 are all in a single specified format. For example, in a preferred embodiment, all the point-to-point connections 150 are high-speed connections realized as Synchronous Transfer Signal (STS)-192 formatted signals. The STS-192 signals are transported on a multi-trace electrical bus formed on a high-speed backplane.

Figure 2:
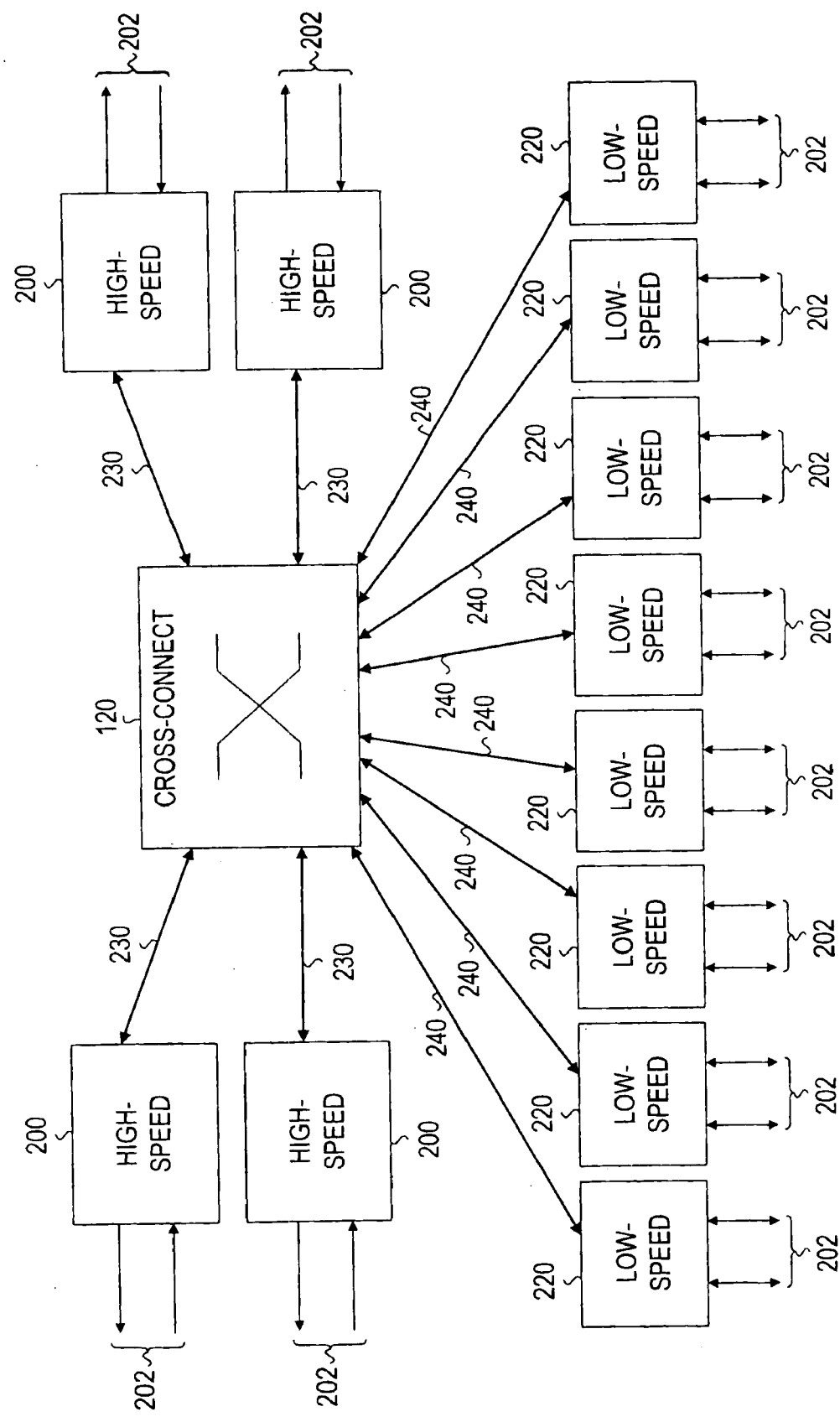
FIG. 2 illustrates a functional diagram of the flexible cross-connect system, according to one embodiment.

In an alternative embodiment, as illustrated in FIG. 2, specific network interface subsystems are designated as high-speed interface subsystems 200 and others are designated as low-speed interface subsystems 220 having corresponding high-speed connections 230 and low-speed connections 240 to the XC 120. For example, the low-speed interconnections 240 may operate at the STS-48 rate of 2.488 Gb/s, while the high-speed interconnections 230 may operate at the STS-192 rate of 9.953 Gb/s.

The high speed network interface subsystems 200 may be realized as printed circuit boards containing active and passive electrical and optical components, and may contain multiple network interfaces 202 operating at the same or different speeds. The low speed network interface subsystems 220 may also be realized as printed circuit boards with active and passive electrical and optical components, and can contain multiple network interfaces 202 operating at the same or different speeds. As an example, a low speed network interface subsystem 220 can be realized as a DS-1 interface board supporting 14 DS-1 interfaces. Alternatively, a low speed network interface subsystem 220 can be realized as an Ethernet board supporting multiple Ethernet interfaces.

Figure 3:
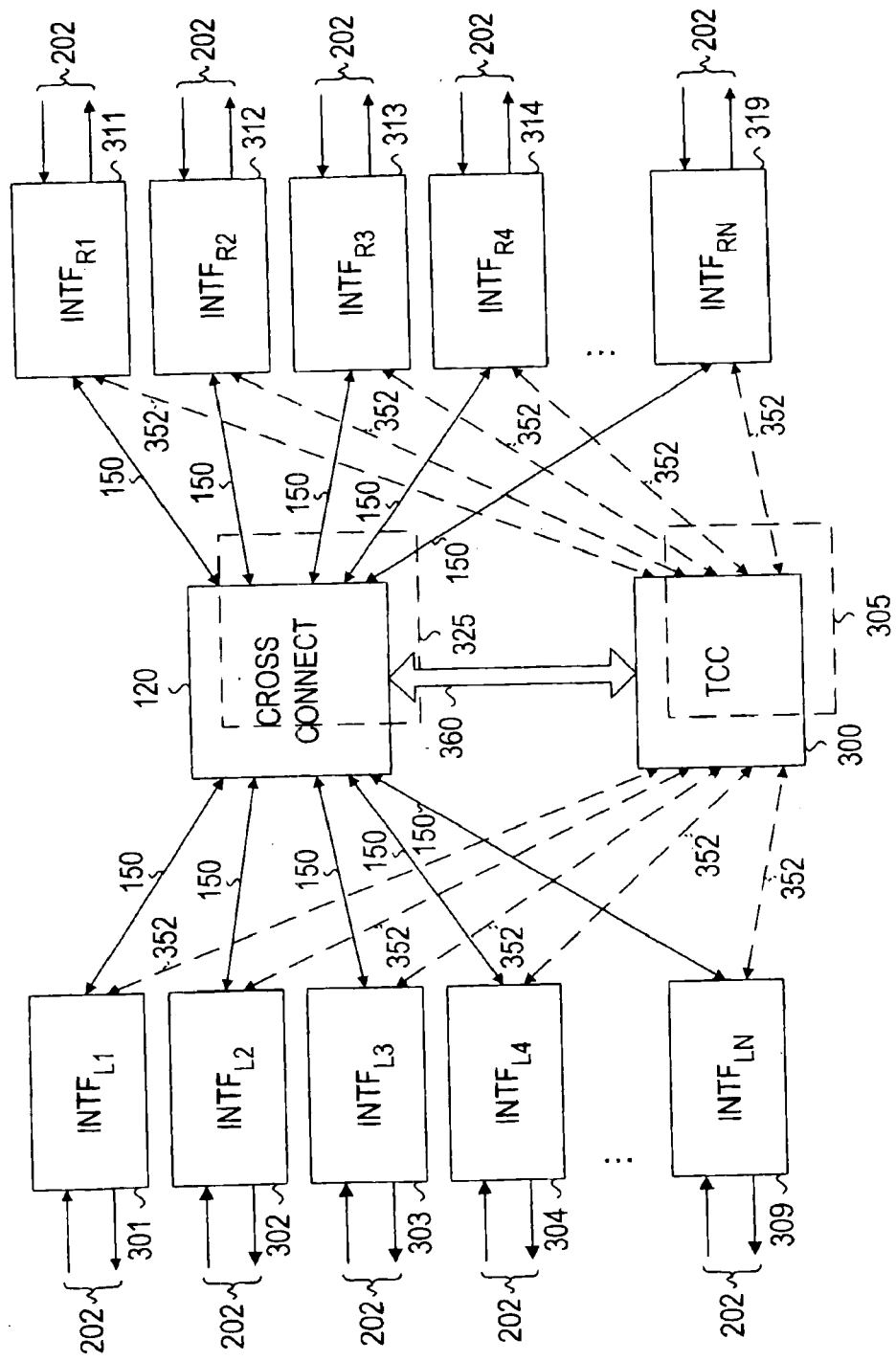
FIG. 3 illustrates communication channels between elements of the flexible cross-connect system, according to one embodiment.

As illustrated in FIG. 3, the XC 120 has direct point-to-point connections 150 with each interface subsystem 301, 302, 303, 304, 309, 311, 312, 313, 314, 319. Each of the interface subsystems 301–304, 309, 311–314, and 319 represents an interface card which is either of the class of cards which are telecom plane network interface subsystems 130 (high-speed) or which are data plane network interface subsystems 140 (low-speed). The designation L and R in network interface subsystems 301–304, 309, 311–314, and 319 are used to simply designate left-hand side or right hand-side of a mechanical configuration, but are not intended to be architectural limitations.

Referring to FIG. 3, there are multiple point-to-point System Communication Links (SCLs) 352 between a centralized timing, control, and communications subsystem (TCC) 300 and each of the interface subsystems 301–304, 309, 311–314, and 319. The TCC 300 is also directly connected to the XC 120 via a TCC to XC communication bus 360. In a preferred embodiment, the system has a redundant XC 325 and a redundant TCC 305.

Figure 4A:
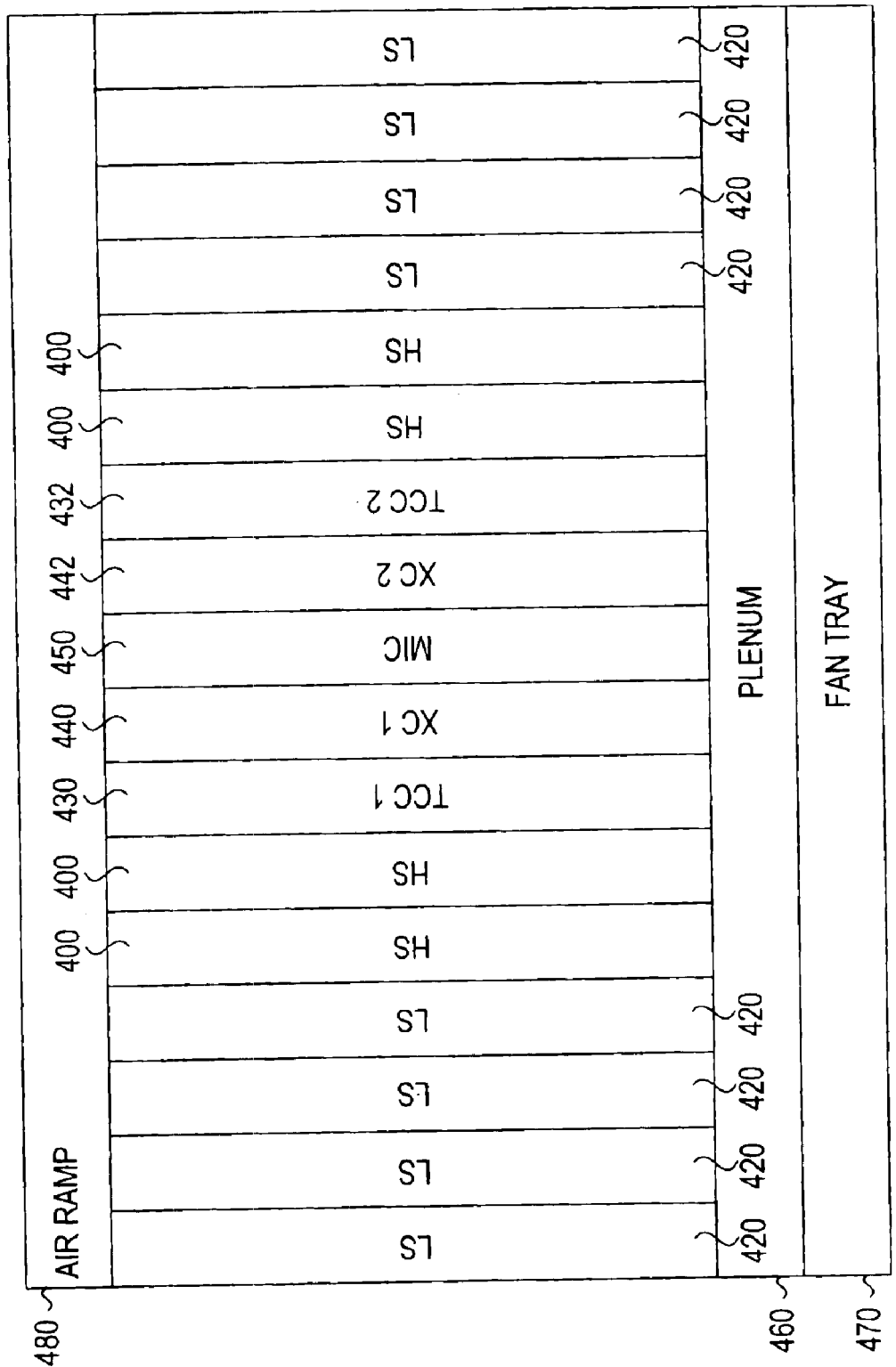
FIGS. 4A and 4B illustrates the mechanical (rack) configuration of the flexible cross-connect system, according to one embodiment.
Figure 4B:
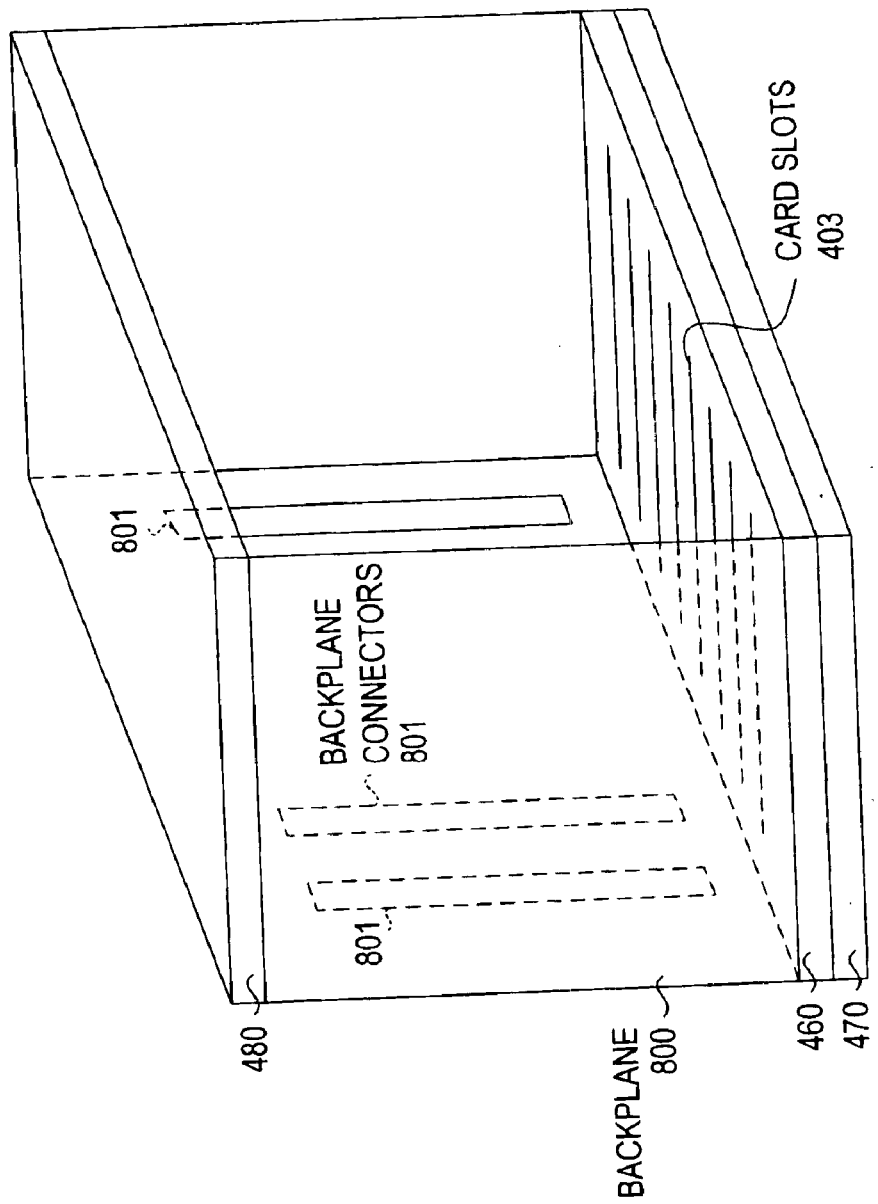

FIGS. 4A and 4B illustrates the system as a rack with card slots. The rack consists of a card cage, a backplane 800, and set of plug-in cards. Mechanical card guides and backplane connectors 801 on the backplane 800 form card slots 403. As illustrated, the card slots 403 in the card cage are numbered from 1 to 17, left to right. The plug-in cards are grouped into two general groups. The first group is the common equipment cards, which include a XC card 440, a redundant XC card 442, a TCC card 430, a redundant TCC card 432, and a Miscellaneous Interface Card (MIC) 450. The second group is the network interface cards and includes low speed cards 420 and high speed cards 400, which form the telecom plane network interface subsystems 130 and the data plane network interface subsystems 140.

As illustrated in FIG. 4A, high-speed network interface cards 400 and low speed network interface cards 420 are supported. In one embodiment, the high speed network interface cards 400 support one or more electrical and optical interfaces up to Optical Carrier (OC)-192 data rates, while the low speed network interface cards 420 support data rates of up to OC-48. Traffic carried through these network interfaces is routed over the backplane 800 to the XC card 440 or the redundant XC card 442.

The point-to-point connections 150 are realized on the backplane 800. In one embodiment, the backplane is a multi-layer board that is capable of providing multiple point-to-point connections 150 between the same devices. In a preferred embodiment, the backplane is capable of transmitting different rate payloads (high-speed and low-speed). Moreover, the backplane is capable of forming data buses that can transmit payloads over different rate data buses. That is, the flexible cross-connect system 10 can be designed to be backward compatible and support payload rates for currently used (or standard) cards at currently used (or standard) data bus rates. In a preferred embodiment, the data buses are formed in the backplane 800 using end-terminated controlled impedance traces and the signals are transmitted between the interface cards and the XC card 440 as single-ended Gunning Transistor Logic (GTL) signals.

Figure 5:
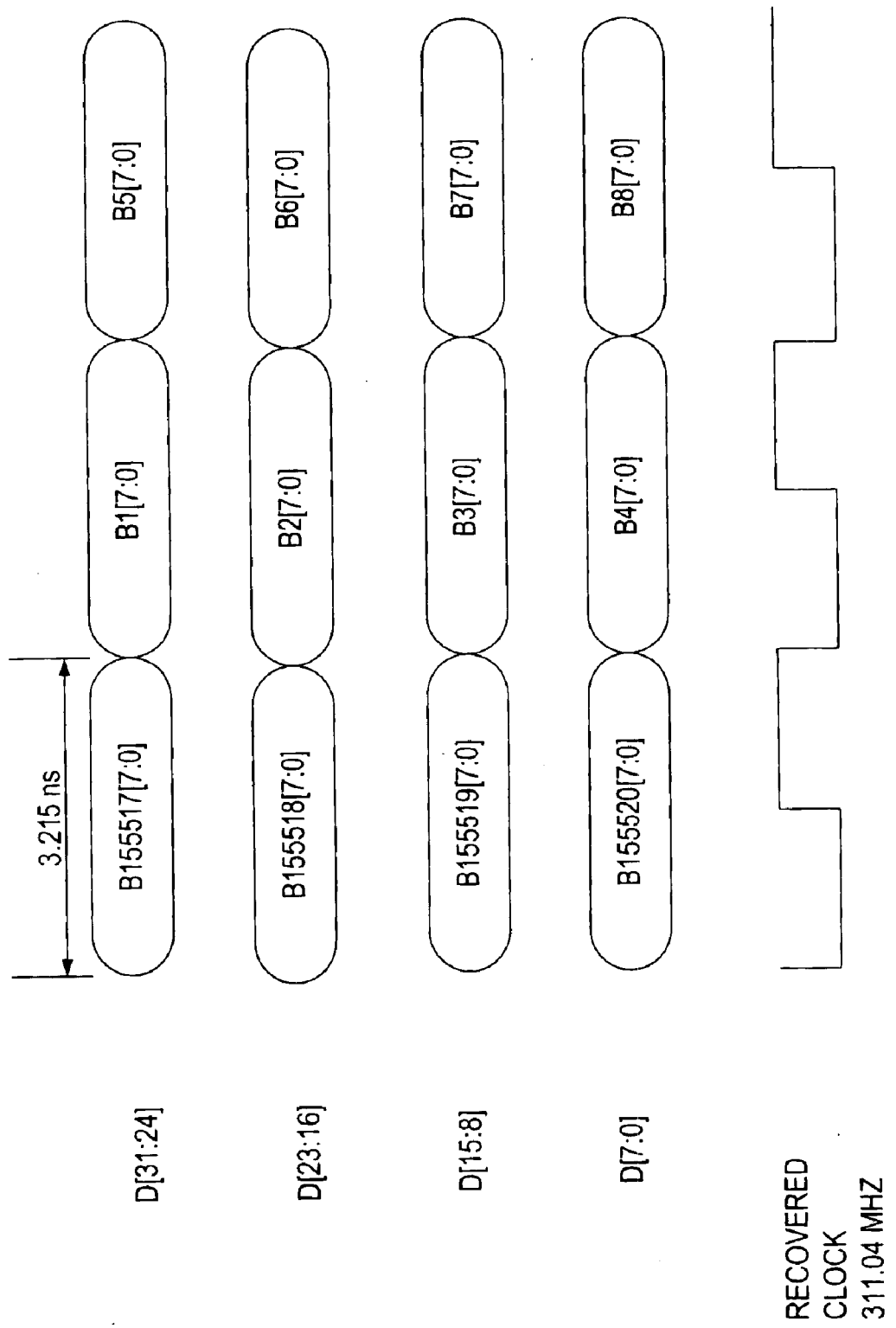
FIG. 5 illustrates the 311 MHz STS-192 bus format, according to one embodiment.

In one embodiment, the point-to-point connections 150 which support high-speed interface cards (STS-192 interface cards) and transmit STS-192 payloads, are realized as a 32-bit parallel data bus operating at 311.04 MHz. The 32-bit parallel bus transmits 32 data signals without any sync or clock signals. Clock recovery is performed at the receiving end, and will be described in more detail later. The 32-bit parallel bus is made up of four 8-bit buses. The STS-192 frame consists of 155,520 bytes. FIG. 5 illustrates the 311 MHz STS-192 bus format. As illustrated, four 8-bit buses, parallel to each other, make up the 32-bit parallel bus. The buses are labeled as carrying 8-bits of a 32-bit word, that is bits 0–7, 8–15, 16–23, and 24–31. As illustrated, the first set of bytes is the last 4 bytes of an STS-192 frame, and the second set is the first 4 bytes of the next frame. Each byte is one cycle of the 311.04 MHz recovered clock and is approximately 3.215 ns.

Figure 6:
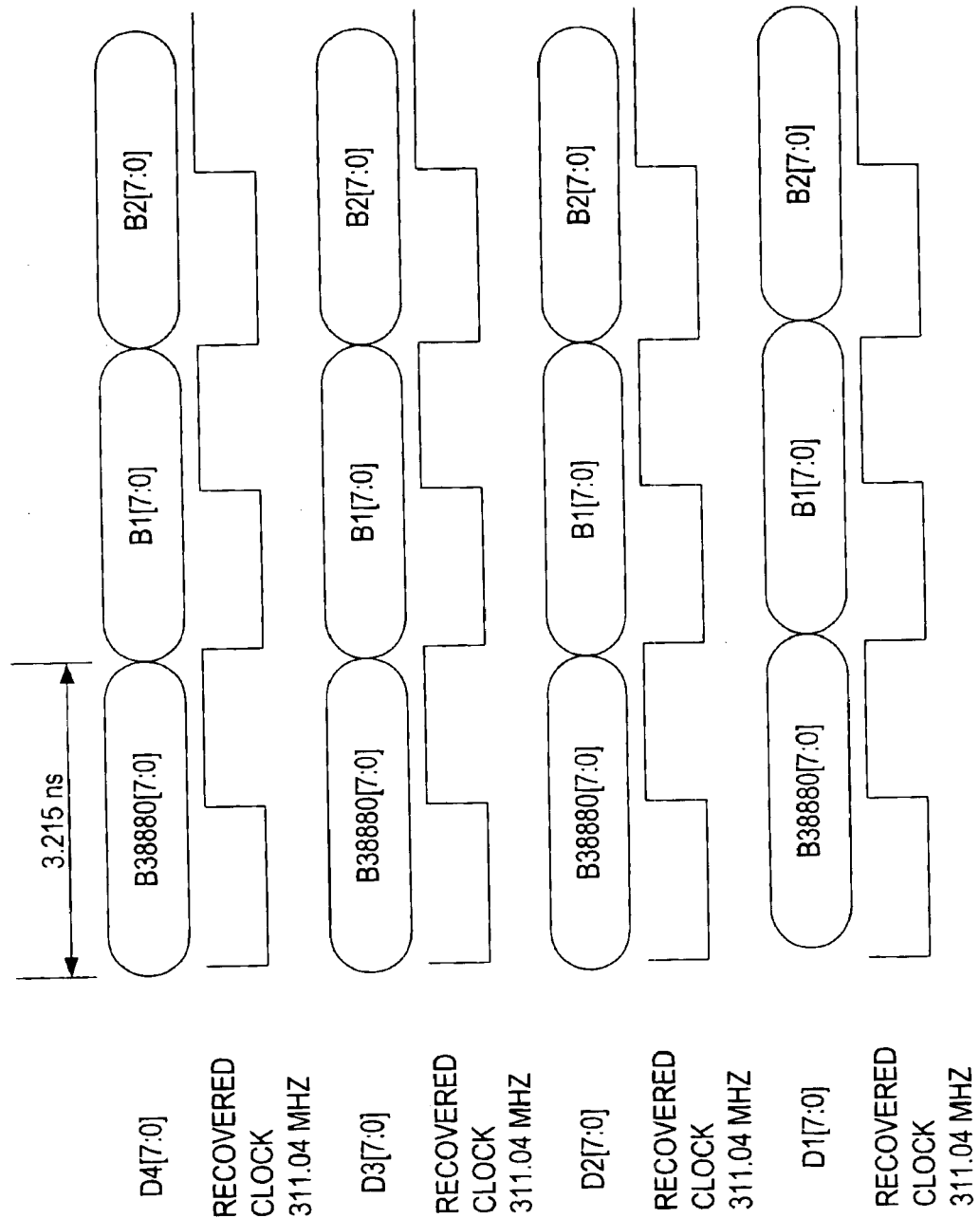
FIG. 6 illustrates the 311 MHz quad STS-48 bus format, according to one embodiment.

In an alternative embodiment, the point-to-point connections 150 which support high-speed interface cards (STS-192 interface cards) can also support a "quad-STS-48" mode, wherein each of the four 8-bit buses support an independent STS-48 frame. FIG. 6 illustrates the 311 MHz quad-STS-48 bus format. As illustrated, four 8-bit buses are each carrying a STS-48 stream, and each bus recovers its own 311.04 MHz clock.

Figure 7:
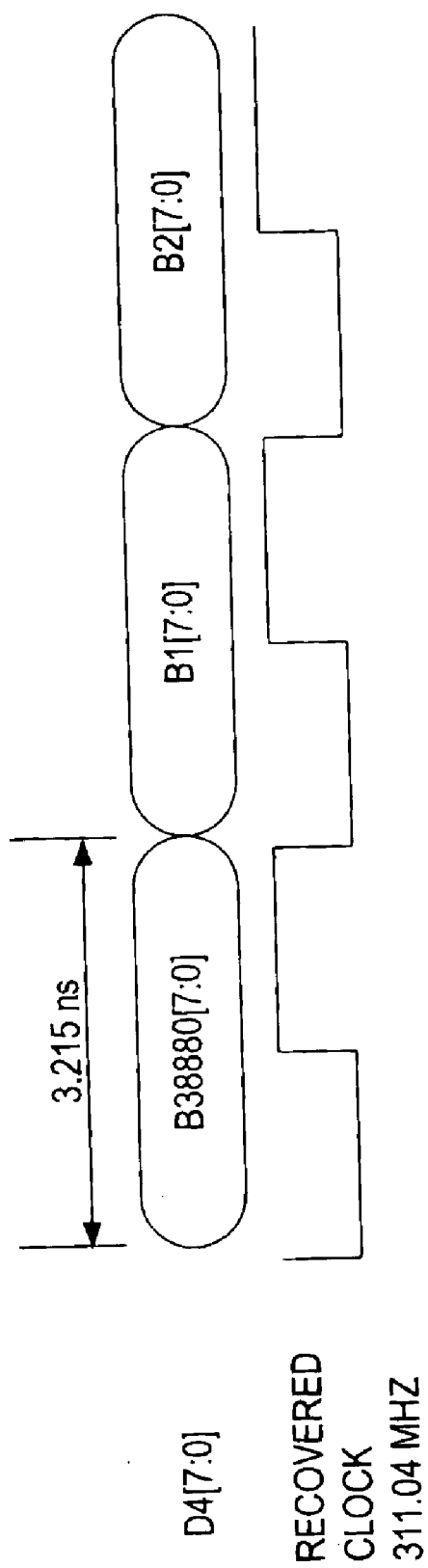
FIG. 7 illustrates the 311 MHz STS-48 bus format, according to one embodiment.

In one embodiment, the point-to-point connections 150 which support low-speed interface cards (STS-48 interface cards) and transmit STS-48 payloads are realized as an 8-bit data bus operating at 311.04 MHz. The 8-bit bus transmits 8 data signals without any sync or clock signals. Clock recovery is performed at the receiving end, and will be described in more detail later. The STS-48 frame consists of 38,880 bytes. FIG. 7 illustrates the 311 MHz STS-48 bus format. As illustrated, an 8-bit bus is utilized to carry the STS-48 stream one byte at a time.

As previously mentioned, the flexible cross-connect system 10 is designed to support standard interface cards and cross connect cards used in current cross-connect systems. These standard interface and cross-connect cards do not support such high-speed data rates (STS-192) and also do not perform clock recovery functions. Designing the flexible cross-connect system 10 in this manner allows the standard interface and cross-connect cards to be supported, and thus does not require that a user update all their interface and/or cross-connect cards in order to use the flexible cross-connect system 10.

Figure 8:
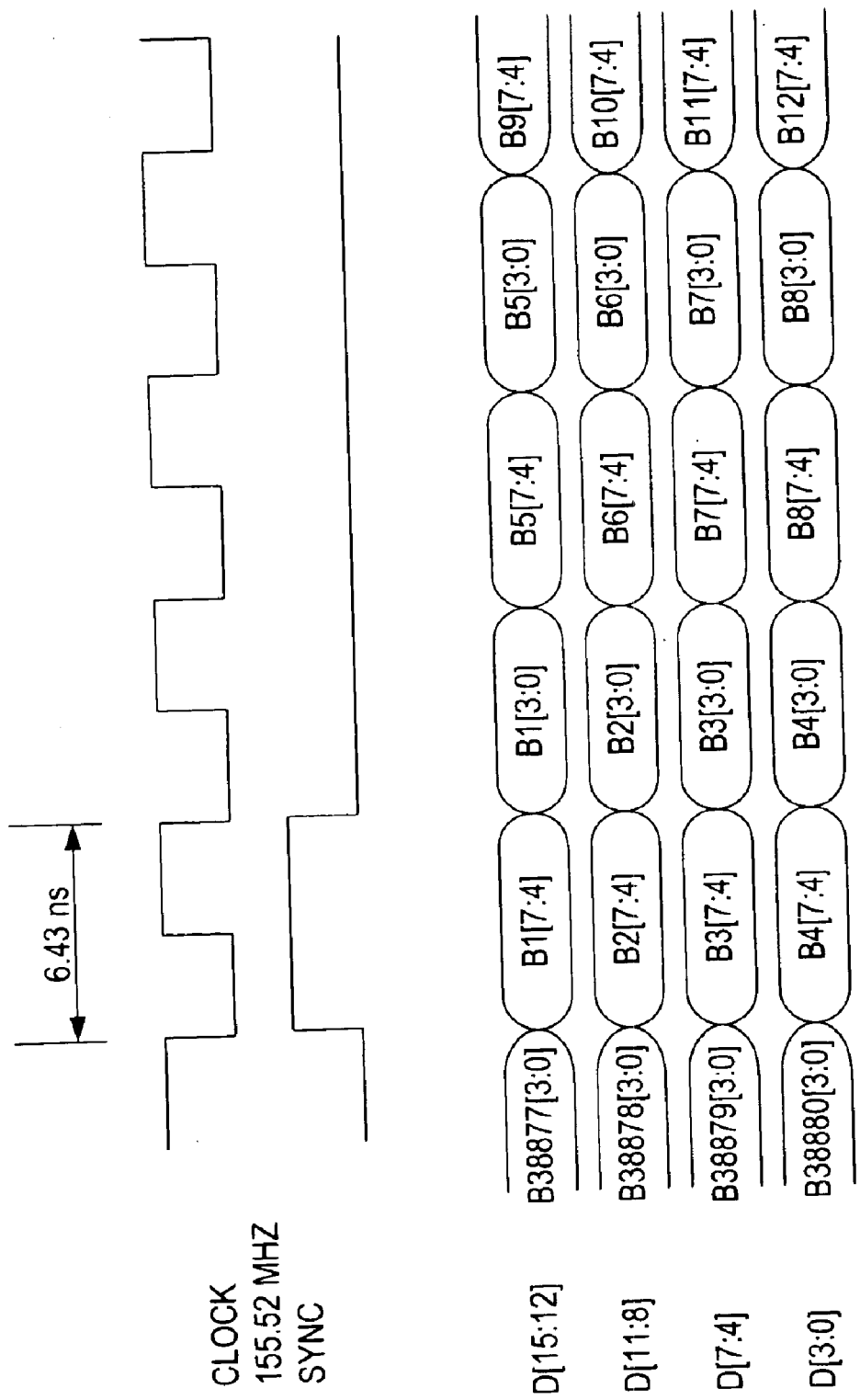
FIG. 8 illustrates the 155 MHz STS-48 bus format, according to one embodiment.

In one embodiment, the point-to-point connections 150 which support standard high-speed interface cards (STS-48 interface cards) and transmit STS-48 payloads are realized as a 16-bit parallel data bus operating at 155.52 MHz. The 16-bit parallel bus transmits 16 data signals, a sync signal, and a clock signal (18 signals). The clock signals are transmitted over the data bus from a differential clock using Low Voltage Differential Signals (LVDS). The STS-48 frame consists of 38,880 bytes. FIG. 8 illustrates the 155 MHz STS-48 bus format. As illustrated, four 4-bit buses, parallel to one another, are used to make up the 16-bit parallel bus. The 16-bit parallel bus transmits 4 bytes of the 38,880 byte STS-48 stream at one time. It takes two clock cycles to transmit each byte, as bits 4–7 are transmitted in a first cycle and bits 0–3 are transmitted in a second cycle. The clock and sync signals are transmitted along with the STS-48 stream. Each clock cycle is approximately 6.03 ns.

Figure 9:
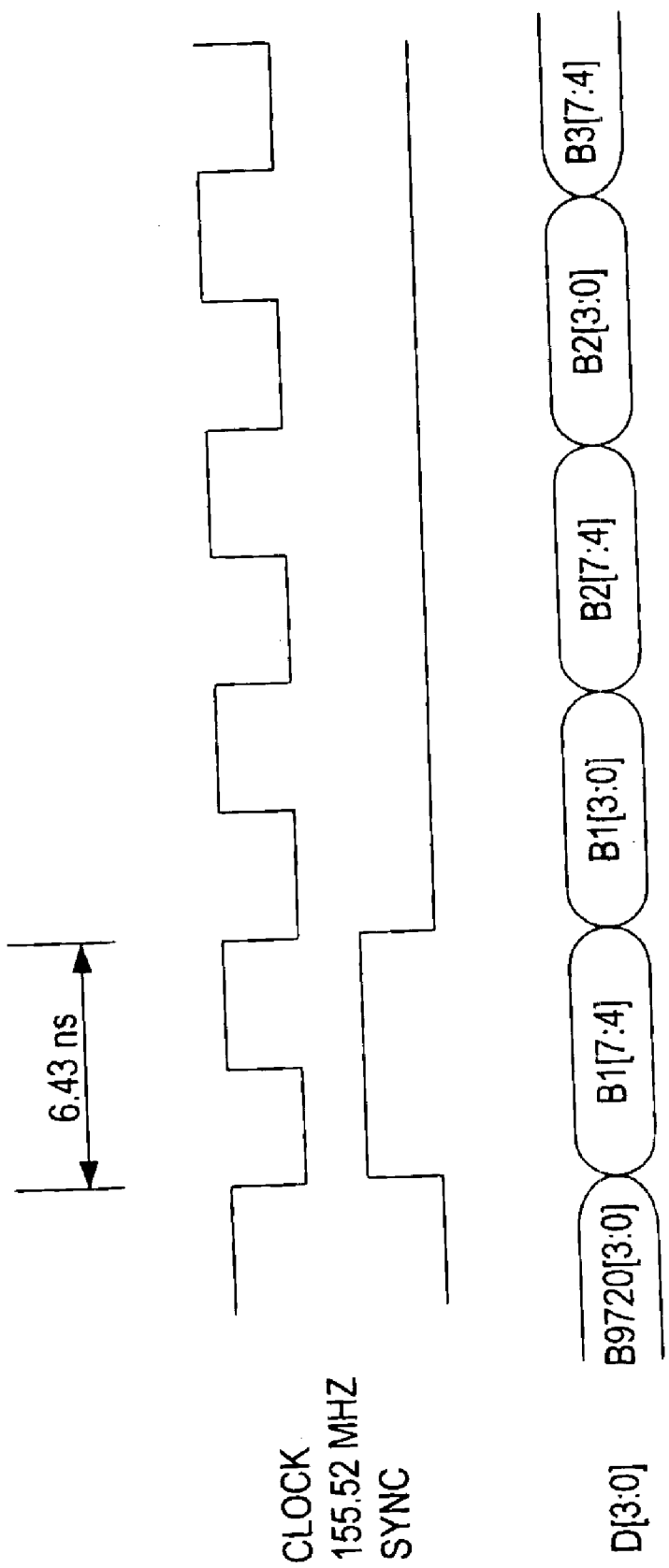
FIG. 9 illustrates the 155 MHz STS-12 bus format, according to one embodiment.

In one embodiment, the point-to-point connections 150 which support standard low-speed interface cards (STS-12 interface cards) and transmit STS-12 payloads are realized as a 4-bit data bus comprising operating at 155.52 MHz. The 4-bit data bus transmits 4 data signals, a sync signal, and a clock signal (6 signals). The clock signals are transmitted over the data bus from a differential clock using Low Voltage Differential Signals (LVDS). The STS-12 frame consists of 9,720 bytes. FIG. 9 illustrates the 155 MHz STS-12 bus format. As illustrated, a 4-bit bus is used to transmit the 9,720 byte STS-12 stream, ½ byte at a time.

The following table summarizes the bus/clock modes, according to one embodiment of the current invention.

| Bus/Clock Mode | Narrow Bus | | Wide Bus | |
| --- | --- | --- | --- | --- |
| | Number of Bits | Data Stream | Number of Bits | Data Stream |
| 311 MHz Clock Recovered Mode | 8 | STS-48 | 32 | STS-192 |
| 155 MHz Clocked Mode | 4 bits data, 1 bit sync | STS-12 | 16 bits data, 1 bit sync | STS-48 |

In a preferred embodiment, the 311 MHz bus groups the data into STS-48 byte streams. The STS-192 streams are converted into four frame-locked STS-48 streams and transmitted over the backplane as such. Thus, the low-speed cards support a single stream while the high-speed slots support up to four streams. Clock recovery, optional scrambling, framing and B1 error checking are performed separately for each STS-48 stream. This independent clock recovery minimizes the amount of signal "de-skewing".

Clock recovery for the 311 MHz data bus is performed by the interface cards and the XC card 440. This ensures that the protection-switching selection between the two TCCs clock outputs will not cause data hits in the system 10.

Clock recovery for the XC card 440 is performed for each STS-48 stream. Clock recovery is accomplished with a per-stream phase-alignment function based on a common, one per card, reference oscillator. In a preferred embodiment, the reference oscillator is a 155.52 MHz VCXO which is phase locked to a 19.44 MHz timing source within the TCC 300 with a phase-detector and a low pass loop filter. Preferably, the phase detector is located on the XC card 440 and the low pass loop filter is externally located. The 155.52 MHz oscillator is multiplied by a phase lock loop (PLL) on the XC card 440 to obtain the 311.04 MHz clock. The 311 MHz clock is used to drive a multi-tap delay line. The delay line output is selected to provide an optimal clock phase for receiving the STS-48 backplane streams.

Clock recovery for the interface cards is performed for each STS-48 stream. Clock recovery is accomplished with a per-stream phase-alignment function based on a common, one per card, reference oscillator. In a preferred embodiment, the reference oscillator is a 155.52 MHz VCXO which is phase locked in a clock recovery PLL to one of the 311 MHz STS-48 backplane streams from the XC card 440. The interface cards use the backplane data timing for clock recovery to prevent large transient clock phase differences that would occur if the interface cards and the XC card 440 used the TCC reference clock. The 155.52 MHz oscillator drives a clock doubler PLL on the interface card to obtain the 311.04 MHz clock. Since clock recovery loops are vulnerable to false locking, the recovered clock will be frequency compared to the 19.44 MHz reference clock from the TCC 300. If a frequency error is detected the, the local clock is locked to the 19.44 MHz reference clock.

The present system can be utilized in a variety of configurations supporting transport of data on MAN/LAN, interLATA and interexchange networks. Because the system can establish cross connections between any interface cards and can use a data plane 140 for local switching, a wide variety of transport configurations can be supported, including configurations in which a virtual LAN is created in the data plane 140, and access to the telecom plane 130 is granted for transport to other nodes.

Although this invention has been illustrated by reference to specific embodiments, it will be apparent to those skilled in the art that various changes and modifications may be made which clearly fall,within the scope of the invention. The invention is intended to be protected broadly within the spirit and scope of the appended claims.

What is claimed:

1. An apparatus for flexibly transmitting data from at least a first interface card to at least a second interface card, wherein the apparatus is capable of supporting multiple types of interface cards, the apparatus comprising:

a plurality of interface cards for transmitting and receiving data streams;

a cross-connect unit for receiving data streams from at least one of said plurality of interface cards, combining the received data streams so a to generate at least one cross-connected data stream, and transmitting the at least one cross-connected data stream to at least one of said plurality of interface cards;

a control unit for controlling the operation of the apparatus; and a backplane forming parallel data buses, including a clock recovered parallel data bus, for providing connectivity between each of said plurality of interface cards, said cross-connect unit, and said control unit, wherein the data streams are transmitted between said plurality of interface cards and said cross-connect unit over the clock recovered parallel data bus without synchronization information from an eternal source.

2. The apparatus of claim 1, wherein the clock recovered parallel data bus has a first bus rate.

3. The apparatus of claim 1, wherein the parallel data buses support at least one bus rate.

4. The apparatus of claim 1, wherein the parallel data buses further includes a clocked parallel data bus.

5. The apparatus of claim 1, further comprising:

a redundant cross-connect unit; and a redundant control unit.

6. The apparatus of claim 1, wherein each of said plurality of interface cards is capable of transmitting and receiving data streams having a plurality of different transmission protocols.

7. The apparatus of claim 1, further comprising a housing that includes a plurality of card slots to hold said plurality of interface cards, said cross-connect unit, and said control unit.

8. The apparatus of claim 7, wherein said backplane connects each of said plurality of card slots to all other of said plurality of card slots so that a first card can communicate with a second card regardless of the location of the cards.

9. The apparatus of claim 1, wherein all of said plurality of interface cards are a first type that can receive data streams up to a first rate, and transmit data streams to said cross-connect unit at the first rate.

10. The apparatus of claim 1, wherein a first set of said plurality of interface cards are a first type that can receive data streams up to a first rate and transmit data streams to said cross connect unit at the first rate, and a second set of said plurality of interface cards are a second type that can receive data streams up to a second rate and transmit data streams to said cross connect unit at the second rate.

11. The apparatus of claim 2, wherein the first bus rate is approximately 311 MHz.

12. An apparatus for flexibly transmitting data from at least a first interface card to at least a second interface card, wherein the apparatus is capable of supporting multiple types of interface cards, the apparatus comprising:

a plurality of interface cards for transmitting and receiving data streams;

a cross-connect unit for receiving data streams from at least one of said plurality of interface cards, combining the received data streams so as to generate at least one cross-connected data stream, and transmitting the at least one cross-connected data stream to at least one of said plurality of interface cards;

a control unit for controlling the operation of the apparatus; and a backplane forming parallel data buses, including a clock recovered parallel data bus, for providing connectivity between each of said plurality of interface cards, said cross-connect unit, and said control unit, wherein the data streams are transmitted between said plurality of interface cards and said cross-connect unit over the clock recovered parallel data bus without synchronization information from an eternal source and wherein the clock recovered parallel data bus is a 32-bit clock recovered parallel data bus.

13. The apparatus of claim 9, wherein said first type of interface cards are high-speed interface cards and the first rate is an STS-192 rate.

14. The apparatus of claim 13, wherein STS-192 data streams are transmitted over four a-bit clock recovered data buses in parallel to each other, forming a 32-bit clock recovered parallel data bus.

15. The apparatus of claim 10, wherein said first type of interface cards are high speed interface cards, the first rate is an STS-192 rate, said second type of interface cards are low speed interface cards, and the second rate is an STS-48 rate.

16. The apparatus of claim 15, wherein STS-192 data streams are transmitted over four 8-bit clock recovered data buses in parallel to each other, forming a 32-bit clock recovered parallel data bus, and STS-48 data streams are transmitted over a single clock recovered 8-bit data bus.

17. The apparatus of claim 1, wherein a first set of said plurality of interface cards support a first set of interface subsystems and a second set of said plurality of interface cards support a second set of interface subsystems.

18. The apparatus of claim 17, wherein the first set of interface subsystems forms a telecommunications plane and the second set of interface subsystems forms a data plane.

19. The apparatus of claim 1, wherein each of said plurality of interface cards format the received data streams, which may have a plurality of different transmission protocols, into payloads having a single format.

20. The apparatus of claim 1, wherein said interface cards include an oscillator that is phase locked to one of the data streams from the cross-connect unit, said oscillator used for clock recovery.

21. The apparatus of claim 20, wherein said oscillator is an approximately 155 MHz oscillator.

22. The apparatus of claim 1, wherein said control unit includes a reference clock.

23. The apparatus of claim 22, wherein said cross-connect unit includes an oscillator that is phase locked to said reference clock, said oscillator used for clock recovery.

24. The apparatus of claim 23, wherein said oscillator is an approximately 155 MHz oscillator and said reference clock is an approximately 19 MHz reference clock.

25. The apparatus of claim 4, further comprising additional interface cards, wherein additional data streams are transmitted between said additional interface cards and said cross-connect unit over the clocked parallel data bus, the additional data streams including data and synchronization information.

26. The apparatus of claim 25, wherein the clocked parallel data bus has a second bus rate.

27. The apparatus of claim 25, wherein all of said additional interface cards are a third type that can receive data streams up to a third rate, and transmit data streams to said cross connect unit at the third rate.

28. The apparatus of claim 25, wherein:

a first set of said additional interface cards are a third type that can receive data streams up to a third rate and transmit data streams to said cross connect unit at the third rate, and a second set of said additional interface cards are a fourth type that can receive data streams up to a fourth rate and transmit data streams to said cross connect unit at the fourth rate.

29. The apparatus of claim 26, wherein the second bus rate is approximately 155 MHz.

30. The apparatus of claim 25, wherein the clocked parallel data bus is a 16-bit clocked parallel data bus.

31. The apparatus of claim 27, wherein said third type of interface cards are high-speed interface cards and the third rate is an STS-48 rate.

32. The apparatus of claim 31, wherein STS-48 data streams are transmitted over four 4-bit clocked data buses in parallel to each other and forming a 16-bit clocked parallel data bus.

33. The apparatus of claim 28, wherein said third type of interface cards are high speed interface cards, the third rate is an STS-48 rate, said fourth type of interface cards are low speed interface cards, and the fourth rate is an STS-12 rate.

34. An apparatus for flexibly transmitting data from at least a first interface card to at least a second interface card, wherein the apparatus is capable of supporting multiple types of interface cards, the apparatus comprising:
    a plurality of interface cards for transmitting and receiving data streams;
    a cross-connect unit for receiving data streams from at least one of said plurality of interface cards, combining the received data streams so as to generate at least one cross-connected data stream, and transmitting the at least one cross-connected data stream to at least one of said plurality of interface cards;
    a control unit for controlling the operation of the apparatus;
    a backplane forming parallel data buses, including a clock recovered parallel data bus, for providing connectivity between each of said plurality of interface cards, said cross-connect unit, and said control unit, wherein the data streams are transmitted between said plurality of interface cards and said cross-connect unit over the clock recovered parallel data bus without synchronization information from an eternal source wherein the parallel data buses further includes a clocked parallel data bus; and
    additional interface cards, wherein additional data streams are transmitted between said additional interface cards and said cross-connect unit over the clocked parallel data bus, the additional data streams including data and synchronization information, a first set of said additional interface cards being of a third type that can receive data streams up to a third rate and transmit data streams to said cross connect unit at the third rate and a second set of said additional interface cards being of a fourth type that can receive data streams up to a fourth rate and transmit data streams to said cross connect unit at the fourth rate, wherein said third type of interface cards are high speed interface cards, the third rate being an STS-48 rate and said fourth type of interface cards are low speed interface cards, and the fourth rate is an STS-12 rate, and wherein STS-48 data streams are transmitted over four 4-bit clocked data buses in parallel to each other and forming a 16-bit clocked parallel bus, and STS-12 data streams are transmitted over a single 4-bit clocked data bus.

35. An apparatus for routing data from at least a first interface card to at least a second interface card, wherein the apparatus is capable of supporting multiple types of interface cards, the apparatus comprising:
    a plurality of interface cards including
        a plurality of clock recoverable interface cards for transmitting and receiving data streams having no synchronization information, and
        a plurality of clocked interface cards for transmitting and receiving data streams including data and synchronization information;
    a cross-connect unit for receiving data streams from at least one of said plurality of interface cards, combining the received data streams so as to generate at least one cross-connected data stream, and transmitting the at least one cross-connected data stream to at least one of said plurality of interface cards;
    a control unit for controlling the operation of the apparatus; and
    a backplane forming parallel data buses including clock recovered parallel data buses and clocked parallel data buses, said parallel data buses providing connectivity between each of said plurality of interface cards, said cross-connect unit, and said control unit.

36. The apparatus of claim 35, wherein data streams to and from said plurality of clocked interface cards is transmitted over the clocked parallel data buses, and data streams to and from said plurality of clock recoverable interface cards is transmitted over the clock recovered parallel data buses.

37. A method for flexibly transmitting telecommunications signals from at least a first interface card to at least a second interface card using a cross-connect apparatus, the method comprising:
    receiving at least a first telecommunications signal at a first interface card;
    transmitting a first payload, which includes the at least a first telecommunications signal, from the first interface card to a cross-connect unit;
    receiving the first payload at the cross-connect unit;
    removing at least the first telecommunications signal from the first payload and inserting at least the first telecommunications signal in a second payload; and
    transmitting the second payload, which includes at least the first telecommunications signal, from the cross-connect unit to a second interface card, wherein the first payload and the second payload do not include synchronization information and are transmitted over a clock recovered parallel data bus formed in a backplane of the cross-connect apparatus without synchronization information from an external source.

38. The method of claim 37, wherein the at least a first telecommunications signal received by the first interface card includes a plurality of signals having different transmission protocols.

39. The method of claim 38, wherein the first interface card transmits the plurality of signals having different transmission protocols to the cross-connect unit at a standard transmission protocol.

40. The method of claim 37, further comprising pre-aligning the at least a first telecommunications signal at the first interface card prior to said transmitting a first payload.

41. The method described in claim 40, wherein said pre-aligning is accomplished by adjusting a programmable offset.

42. The method of claim 37, further comprising:
    aggregating the telecommunications signals received from a data plane to form an aggregated telecommunication signal, the data plane being formed by connecting several interface cards together; and transmitting a third payload, including the aggregated telecommunication signal, to the cross-connect unit.

43. The method of claim 42, further comprising removing the aggregated telecommunication signal from the third payload and inserting the aggregated telecommunications signal in a fourth payload.

44. The method of claim 37, further comprising:

receiving at least a second telecommunications signal at a third interface card;

transmitting a third payload, which includes the at least a second telecommunications signal, from the third interface card to the cross-connect unit;

receiving the third payload at the cross-connect unit;

removing the second communications signal in a fourth payload; and transmitting the fourth payload from the cross-connect unit to a fourth interface card, wherein the third payload and the fourth payload include data and synchronization information and are transmitted over a parallel clocked data bus formed in the backplane.

45. An apparatus for flexibly transmitting data from at least a first interface card to at least a second interface card, the apparatus comprising:

means for receiving at least a first telecommunications signal at a first interface card;

means for transmitting a first payload, which includes the at least a first telecommunications signal, from the first interface card to a cross-connect unit;

means for receiving the first payload at the cross-connect unit;

means for removing at least the first telecommunications signal from the first payload and inserting at least the first telecommunications signal in a second payload; and means for transmitting the second payload, which includes at least the first telecommunications signal, from the cross-connect unit to a second interface card, wherein the first payload and the second payload do not include synchronization information and are transmitted over a clock recovered parallel data bus formed in a backplane of the cross-connect apparatus without synchronization information from an external source.

46. The apparatus of claim 45, wherein the at least a first telecommunications signal received by the first interface card includes a plurality of signals having different transmission protocols.

47. The apparatus of claim 45, further comprising means for pre-aligning the at least a first telecommunications signal at the first interface card prior to transmitting a first payload.

48. The apparatus of claim 45, further comprising:

means for aggregating the telecommunications signals received from a data plane to form an aggregated telecommunication signal, the data plane being formed by connecting several interface cards together; and means for transmitting a third payload, including the aggregated telecommunication signal, to the cross-connect unit.

* * * * *